(12) United States Patent
Novicky

(10) Patent No.: US 6,559,198 B2
(45) Date of Patent: May 6, 2003

(54) FLUOROCARBON-SULFONE HYDROPHILIC CONTACT LENSES, OPTICAL MEDICAL DEVICES AND COMPOSITIONS THEREOF

(76) Inventor: Nick Novicky, #20, 1410-4oth Ave., NE, Calgary, Alberta (CA), T2E 6L1

( * ) Notice: Subject to any disclaimer, the term of this patent is extended or adjusted under 35 U.S.C. 154(b) by 0 days.

(21) Appl. No.: 09/898,494

(22) Filed: Jul. 5, 2001

(65) Prior Publication Data

US 2003/0027886 A1 Feb. 6, 2003

(51) Int. Cl.$^7$ .......................... G02C 7/04; C08F 217/18
(52) U.S. Cl. ....................... 523/106; 523/108; 526/243; 526/244; 526/245; 526/270; 524/544; 351/160 H
(58) Field of Search ................................. 523/106, 108; 526/243, 244, 245, 270; 524/544; 351/160 H

(56) References Cited

U.S. PATENT DOCUMENTS

| | | | | |
|---|---|---|---|---|
| 4,861,850 A | * | 8/1989 | Novicky | ...................... 526/243 |
| 5,079,319 A | * | 1/1992 | Mueller | |
| 5,824,719 A | * | 10/1998 | Kunzler et al. | ............. 523/106 |
| 6,107,015 A | * | 8/2000 | Anderson et al. | |
| 6,245,854 B1 | * | 6/2001 | Obioha et al. | |
| 6,380,336 B1 | * | 4/2002 | Soane et al. | |

* cited by examiner

*Primary Examiner*—Tae H. Yoon
(74) *Attorney, Agent, or Firm*—Stevens, Davis, Miller & Mosher, L.L.P.

(57) ABSTRACT

Highly comfortable hydrophilic contact lenses are made from a coploymer of an ethylenically unsaturated fluorosulfone ester, ethylenically unsaturated fluorosulfone ester monomer of acrylic or methacrylic acid having alkyl hydroxy group and N-Vinyl 2-pyrrolidinone and methods for the manufacturing thereof.

13 Claims, No Drawings

FLUOROCARBON-SULFONE HYDROPHILIC CONTACT LENSES, OPTICAL MEDICAL DEVICES AND COMPOSITIONS THEREOF

BACKGROUND OF THE INVENTION

1. Field of the Invention

The present invention relates to novel formulation of monomers, to produce polymers for the purpose of manufacturing hydrophilic contact lenses and other optical devices, including optical medical devices. In particular, one important use of the materials made from the invention is the manufacture of corneal contact lenses.

2. Description of the Related Art

In recent years, hydrophilic corneal contact lenses have become more and more popular in the United States, Canada and throughout the world. In an attempt to create contact lenses which are comfortable and oxygen permeable and essentially clean from deposits it requires incorporation of a longer fluorocarbon chain component in order to make the surface of the lens slick, permitting easy movement on the eye without any friction, and wettable to accomplish necessary comfort for the patient.

Previous hydrophilic contact lenses are based on 2-hydroxyethyl methacrylate (HEMA) or derivatives thereof which produce reasonable comfort to the patient while they are clean; however, when worn for a longer period of time they have a tendency to accumulate deposits or debris on the surface of the lens and then require constant cleaning or in other cases become disposable, that patient has to dispose of contact lenses and get new ones.

While such materials accumulate proteinaceous matter as a deposit on the lens surface, the lens is impaired to proper transparency or if the deposits on the lens are too large, the lens could cause abrasion to the wearer's eyes.

SUMMARY OF THE INVENTION

The present invention, therefore is intended to improve performance of a hydrophilic contact lens on the human eyes. The copolymers of the present invention will give very good optical clarity when hydrated and also because they contain fluorocarbon chain monomer, which gives very good slick surface of the lens which remains free of debris or deposits, even when lenses are worn for longer periods of time. The copolymer plastic, when hydrated, will have increased strength over HEMA hydrophilic contact lenses. The copolymer plastic of the present invention can be prepared by polymerization in the rod form and then processed to the contact lens blanks and ultimately to the contact lenses, or can be directly cast molded in specific molds directly into the form of contact lenses.

DETAILED DESCRIPTION OF THE PREFERRED EMBODIMENTS

A still further facet of the invention includes synthesis of the copolymer plastic which, when hydrated in saline solution, gives water content between 25% to 60% which can be used for other medical devices, such as intra-ocular lenses, lenses for instruments used for body contact and health diagnostic instruments. The present invention includes the following monomers: [2-(N-Ethylperfluorooctanesulfonamido)methacrylate]

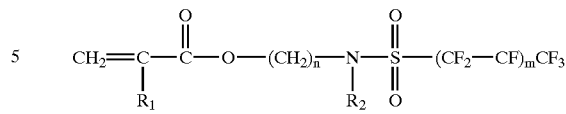

wherein $R_1$ and $R_2$, which maybe the same or different, are hydrogen, alkyl, cyclic or phenyl groups, n is an integer from 1 to 5 and m is an integer from 0 to 10. Typical monomers are: 2-(N ethylperfluoroalkylsulfonamido) ethylmethacrylate, 2-(N ethylperfluoroalkylsulfonamido) ethylacrylate, or mixtures thereof.

Representative of the hydroxyalkyl monomer of acrylic or methacrylic acid are those having the following general formula:

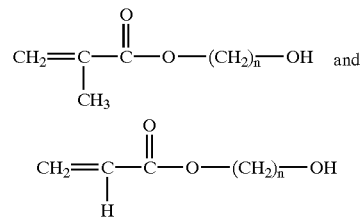

wherein n is an integer from 1 to 5, and 2,3 dihydroxypropyl acrylate and 2,3 dihydroxyproply methacrylate or mixtures thereof. Representative of heteroatom hydrophilic monomer are those having the following general formula:

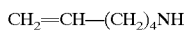

N-Vinyl 2-pyrrolidinone

An additional sulfone monomer can be incorporated into copolymeric plastic of the present invention. The preferable monomers are:
methyl vinyl sulfone,
methyl styrene sulfone,
ethyl vinyl sulfone,
ethyl styrene sulfone,
propyl vinyl sulfone,
propyl styrene sulfone,
phenyl vinyl sulfone,
phenyl styrene sulfone,
cyclohexyl vinyl sulfone,
cyclohexyl styrene sulfone,
pentyl vinyl sulfone,
pentyl styrene sulfone,
butyl vinyl sulfone,
butyl styrene sulfone,
phenoxyethyl vinyl sulfone,
phenoxyethyl styrene sulfone,
divinyl sulfone,
methacryloxyethyl methyl sulfone,
methacryloxyethyl ethyl sulfone,
methacryloxyethyl propyl sulfone,
methacryloxyethyl butyl sulfone,
methacryloxyethyl phenyl sulfone,
methacryloxyethyl pentyl sulfone,
methacryloxyethyl styrene sulfone,
or mixtures thereof.

The hydrophilic contact lens material can be further modified by the addition of methacrylic acid or acrylic acid and a small amount of cross-linking agent to improve overall performance of the contact lenses. Representative cross-linking agents are ethyleneglycol dimethacrylate, diethyleneglycol dimethacrylate, triethyleneglycol dimethacrylate, tetraethyleneglycol dimethacrylate, ethyleneglycol diacrylate, diethyleneglycol diacrylate, triethyleneglycol diacrylate, tetraethyleneglycol diacrylate, divinyl benzene, divinyl sulfone, trimethylolpropane trimethacrylate or mixtures thereof.

The preferred composition of the present invention comprises:
- (a) from about 5 to 65 weight percent of ethylenically unsaturated fluorosulfonamidoethyl ester monomer of acrylic or methacrylic acid or mixtures thereof.
- (b) from about 5 to 70 weight percent of ethylenically unsaturated hydroxyalkyl monomer of acrylic or methacrylic acid or mixtures thereof.
- (c) from about 2 to 40 weight percent of N-Vinyl 2-pyrrolidinone.
- (d) from about 0.1 to 8 weight percent of acrylic or methacrylic acid or mixtures thereof.
- (e) from about 0.1 to 7 weight percent of cross-linking agent monomer (preferably ethyleneglycol dimethacrlate, diethyleneglycol dimethacrylate, triethyleneglycol dimethacrylate and tetraethyleneglycol dimethacryalte or mixtures thereof).

The polymerization of the oxygen permeable wettable contact lens material is disclosed in the prior art using free-radical polymerization techniques such as disclosed in Novicky U.S. Pat. No. 4,861,850.

EXAMPLE 1

This example illustrates the preparation of representative copolymer plastic material for hydrophilic contact lenses:
to a 200 ml flask is added 50 grams of HEMA (2-hydroxyethylmethacrylate), 10 grams of N-Vinyl 2-pyrrolidinone, 40 grams of [2-(N-Ethylperfluorooctanesulfonamido)methacrylate], 0.5 grams of t-butylperoxyoctoate, all components are mixed thoroughly and poured into polypropylene tubes, molds closed with stoppers and polymerized in a water bath or thermostated oven set at 65° C. for a period for about 20 hours. The rods or blanks are then put into thermostated oven preheated at 105° C. for a period of 24 hours. The copolymer plastic is hard and suitable for the manufacturing of contact lenses and then when emersed in saline solution (such as Alcon OPTI-FREE) it becomes hydrophilic lens having water content about 32 to 35 weight percent.

EXAMPLE 2

This example illustrates preparation of direct casting of contact lenses. To a 200 ml flask was added 30 g of [2-(N-Ethylperfluorooctanesulfonamido)methacrylate], 55 g of 2-hydroxyethyl methacrylate, 15 g of N-Vinyl 2-pyrrolidinone and 0.5 grams of free radical catalyst VAZO 67; all components are thoroughly mixed and poured to the cast contact lens molds (such as a described in the Travnicek U.S. Pat. No. 4,165,158) polymerization was carried from room temperature (21° C.) gradually increasing to 115° C. over a period of 3 hours and then for an additional 2 hours temperature was held at constant to finish polymerization. Then oven was turned off and gradually temperature was brought down to room temperature. The casting molds were removed from the oven, separated and the contact lenses were removed from the concave portion of the mold, then hydrated in Alcon OPTI-FREE multi-purpose solution, the expansion factor was 1.15 and water content of the lens was 38 to 42 weight percent. The power of the lens on hydration changed 0.75 diopters. The hydrated lens was very clear, very slippery, very suitable and wettable hydrophilic contact lens.

EXAMPLE 3

This example illustrates preparation of representative copolymer plastic material for hydrophilic contact lenses. To a 200 ml flask add 50 g of distilled HEMA, 10 g of N-Vinyl 2-pyrrolidinone, 0.5 g of diethyleneglycol dimethacrylate, 4.5 g of methacrylic acid, 35 g of 2-(N ethylperfluoroalkylsulfonamido)ethylmethacrylate, then stir all mixture thoroughly together and add 0.5 g of IABN catalyst; and continue to stir until all catalyst is dissolved. Pour mixture into contact lens mold cavities, close the molds with the convex part of the mold and polymerize in thermostated oven at programmable temperature starting from 30° C. to 118° C. for over a 2 hour period. Slowly cool down the oven to room temperature, remove the molds from the oven and remove the lenses from the casting molds. Hydrate the lenses for 2 days plus period in Alcon OPTI-FREE solution. Inspect the lenses for clarity, water content and lens power change after hydration. Place label on the vial and store them in sealed containers to be processed for sterilization.

EXAMPLE 4

This example illustrates preparation of copolymerplastic material with additional polysulfone monomer. To 200 ml flask add 40 g of distilled HEMA, 10 g of vinylmethyl sulfone, 10 g of N-Vinyl 2-pyrrolidinone and 40 g of 2-(N ethylperfluorooctylsulfonamido)ethylmethacrylate and stir thoroughly; then add 0.5 g of IABN catalyst and stir until all catalyst is dissolved. Pour the mixture into suitable polypropylene molds and polymerize in thermostated oven starting from 30° C. to 118° C. programmable over a 2 hour period of time. Process the lenses in the same way as in EXAMPLE #3 using Alcon OPTI-FREE solution.

EXAMPLES 5–10

Samples of optically clear plastic hydrophilic contact lenses were prepared with accordance of EXAMPLE 3; however, components composition was different like is described in the following table:

TABLE

| Components (Parts) | Example Number | | | | | |
|---|---|---|---|---|---|---|
| | 5 | 6 | 7 | 8 | 9 | 10 |
| 2-(N ethylperfluoroalkylsulfonamido)-ethylacrylate | 20 | | | | | 10 |
| N-Vinyl 2-pyrrolidinone | 15 | 10 | 12 | 9.5 | 20 | 10 |
| 2-hydroxyethylmethacrylate | 50 | 60 | 50 | 50 | 40 | 35 |
| methacrylic acid | 5 | 3 | 4 | | | |
| ethyleneglycol dimethacrylate | | | 0.5 | | | |
| diethyleneglycol dimethacrylate | | | | 0.5 | | |
| methylvinyl sulfone | | 5 | | | | |
| phenyl styrene sulfone | | | 8 | | | |
| methacryloxyethyl methyl sulfone | | | | 10 | | |
| 2-(N ethylperfluorooctylsulfonamido)-ethylmethacrylate | 10 | 22 | 25.5 | 30 | 40 | 45 |

* All samples of the above copolymer plastic are clear after hydration and transparent contact lenses.

EXAMPLE 11

This example illustrates preparation of the copolymer plastic for hydrophilic contact lenses with addition of handling tint to it. The copolymer plastic was prepared in accordance with EXAMPLE 3 and 0.01% of D&C #6 green dye was added to monomer mixture and polymerized same way as described in the above reference example, the resulting contact lenses after hydration had slight blueish tint to it for easy use for the wearer.

Although I have described my invention in connection with specific examples and preferred embodiments thereof, it is readily apparent to those skilled in the art that my invention may be modified without departing from the scope of the appended claims.

I claim:

1. A contact lens comprising a copolymer consisting essentially of from about 25 to about 60 weight percent of a ethylenically unsaturated fluorosulfone ester monomer having the general formula (I):

$$CH_2=C(R_1)-C(=O)-O-(CH_2)_n-N(R_2)-S(=O)_2-(CF_2-CF)_mCF_3 \quad (I)$$

wherein $R_1$ and $R_2$, which may be the same or different, are hydrogen, alkyl, cyclic or phenyl groups, n is an integer from 1 to 5; and m is an integer from 0 to 10, the balance consisting of at least one co-monomer selected from the group consisting of hydroxyalkyl monomers of acrylic or methacrylic acids, sulfone monomers and pyrrolidinone, and at least one wettability agent selected from the group consisting of methacrylic acid, acrylic acid and mixtures thereof, and optionally a cross-linking agent, a dye or pigment, and mixtures thereof, wherein said copolymer is immersed in saline solution and produces hydrophilic polymer having between 25 to 60 weight percent water content.

2. A contact lens according to claim 1, wherein a cross-linking agent is present in an amount ranging from about 0.1 to about 5 weight percent.

3. The contact lens of claim 1, wherein the hydroxyalkyl monomers of acrylic or methacrylic acid are selected from the group consisting of 2,3 dihydroxypropyl acrylate, 2,3 dihydroxypropyl methacrylate, 2-hydroxyethyl methacrylate, 2-hydroxyethyl acrylate and mixtures thereof.

4. The contact lens of claim 1, wherein the monomer of formula (I) is selected from the group consisting of 2-(N ethylperfluoroalkylsulfonamido)ethylmethacrylate and 2-(N ethylperfluoroalkylsulfonamido)ethylacrylate and mixtures thereof.

5. The contact lens of claim 1, further comprising a cross linking agent.

6. The contact lens of claim 1, which has been formed by casting.

7. The contact lens according to claim 1, wherein the hydroxyalkyl monomers of acrylic or methacrylic acid have the general formula:

$$CH_2=C(CH_3)-C(=O)-O-(CH_2)_n-OH \quad \text{and}$$

$$CH_2=C(H)-C(=O)-O-(CH_2)_n-OH$$

wherein n is an integer of 1 to 5.

8. The contact lens according to claim 1, wherein the hydroxy alkyl monomers of acrylic or methacrylic acid is at least one selected from the group consisting of 2-hydroxyethylmethacrylate and 2-hydroxyethylacrylate.

9. The contact lens according to claim 1, wherein the pyrrolidinone is N-vinyl 2-pyrrolidinone.

10. The contact lens according to claim 1, wherein the sulfone monomer is selected from the group consisting of:
methyl vinyl sulfone,
methyl styrene sulfone,
ethyl vinyl sulfone,
ethyl styrene sulfone,
propyl vinyl sulfone,
propyl styrene sulfone,
phenyl vinyl sulfone,
phenyl styrene sulfone,
cyclohexyl vinyl sulfone,
cyclohexyl styrene sulfone,
pentyl vinyl sulfone,
pentyl styrene sulfone,
butyl vinyl sulfone,
butyl styrene sulfone,
phenoxyethyl vinyl sulfone,
phenoxyethyl styrene sulfone,
divinyl sulfone,
methacryloxyethyl methyl sulfone,
methacryloxyethyl ethyl sulfone,
methacryloxyethyl propyl sulfone,
methacryloxyethyl butyl sulfone,
methacryloxyethyl phenyl sulfone,
methacryloxyethyl pentyl sulfone,
methacryloxyethyl styrene sulfone,
and mixtures thereof.

11. A copolymer plastic hydrophilic contact lens material consisting of perfluoroamidosulfone monomers of acrylic and methacrylic acid and pyrollidinone, and at least one wettability agent selected from the group consisting of methacrylic acid, acrylic acid and mixtures thereof, and optionally a cross-linking agent, a dye or pigment, and mixtures thereof, wherein the cross-linking agent is present in amount ranging from 0.1 to 5 weight percent.

12. A contact lens formed by casting a copolymer plastic hydrophilic contact lens material consisting of perfluoroamidosulfone monomers of acrylic and methacrylic acid and pyrollidinone, and at least one wettability agent selected from the group consisting of methacrylic acid, acrylic acid and mixtures thereof, and optionally a cross-linking agent, a dye or pigment, and mixtures thereof.

13. The contact lens of claim 1 further comprising a dye or pigment.

* * * * *